No. 845,723. PATENTED FEB. 26, 1907.
C. TIMMERMAN.
FEED WATER PURIFIER.
APPLICATION FILED MAR. 31, 1906.
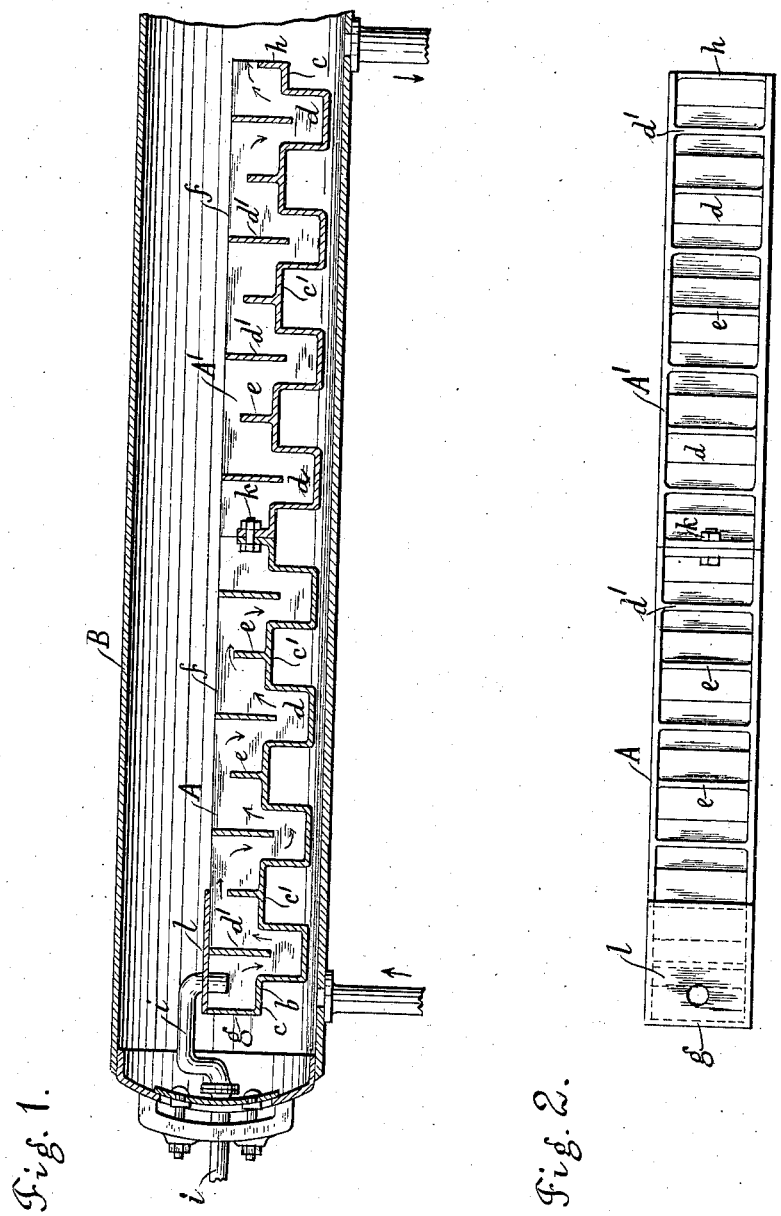

UNITED STATES PATENT OFFICE.

CHARLES TIMMERMAN, OF NEW YORK, N. Y.

FEED-WATER PURIFIER.

No. 845,723.　　　Specification of Letters Patent.　　　Patented Feb. 26, 1907.

Application filed March 31, 1906. Serial No. 309,169.

*To all whom it may concern:*

Be it known that I, CHARLES TIMMERMAN, a citizen of the United States, and a resident of the city of New York, borough of Brooklyn, county of Kings, and State of New York, have invented certain new and useful Improvements in Feed-Water Purifiers for Boilers.

My invention relates to steam-boilers and other steam-generating apparatus, and consists of the hereinafter more fully described device for eliminating from the feed-water and retaining the scale-forming substances and other impurities, whereby the forming and accumulating of scale in the boiler is prevented.

The apparatus embodying my inventions is shown in the accompanying drawings, wherein—

Figure 1 is a longitudinal sectional view of a boiler provided with my improved apparatus, and Fig. 2 is a plan view of the apparatus.

My improved device for eliminating scale-forming substances and other impurities from the feed-water and for retaining them consists of a trough (or series of troughs) provided with recesses in the bottom and with transverse partitions, so arranged that the water flowing through the trough (or series of troughs) is forced to alternately descend into the recesses provided in the bottom and from there to rise over the intermediate partitions. The scale-producing substances are eliminated from the water by the change of its temperature and are precipitated thereby. The precipitating of these substances (and whatever other impurities may be contained in the water) occurs mainly during the period when the temperature of the water rises during its flow upward and is proportionately greater as the difference between its lowest and its highest point increases. By forcing the feed-water to flow first to the bottom of the recesses $d$ and then to rise again from there above the upper edges of partitions $e$ its temperature is repeatedly changed, raised and reduced, and thereby nearly all, if not all, of the scale-producing substances and other impurities are precipitated from the feed-water during the progress of its flow through the apparatus and before it is permitted to overflow at the rear end of the trough. These recesses $d$ also facilitate the accumulation of the sediments and increase the area and length of the flow of the water through the purifying device, though their main object is to render the flow more tortuous and to obstruct it by causing deflections and eddies in the flow and to increase the difference between the highest and lowest strata in the flow.

The construction of a device embodying this arrangement is shown in the longitudinal sectional view in Fig. 1 of the drawings. The purifying device there shown consists of two sections A and A', preferably joined together by bolts $k$, as shown. Any number of such sections may be joined into one apparatus. The arrangement in sections is preferable on account of the easier manner of handling the apparatus—that is, installing and removing it from the drum B of the boiler. It is, however, not essential to the working of the device. The bottom $b$ of the trough is recessed at intervals, as shown at $d\ d\ d$, its intermediate portions $c'$ being raised to the same level as the portions $c$ at both ends of the trough.

Partitions $e$, set upon the raised portions $c'$ of the trough, terminate some distance below the upper edge $f$ of the trough and divide the trough in approximately equal compartments. Approximately midway of these partitions deflecting-plates $d'$ are set extending from the upper edge $f$ of the trough to about the level of the raised portions of the bottom $b$ thereof. They may extend below this level, and it is advantageous to do so if the water to be purified is rich on scale-forming substances or where the drum B of the boiler is comparatively short or of small diameter. Both ends of the trough are closed, the forward end $g$ fully and the rear end $h$ only to a point approximately one inch below the level of the upper edges of partitions $e$. The first of the compartments—that is, the one beginning at the front end of section A—is covered by a plate $l$, and the feed-pipe $i$ enters through an opening provided in this plate $l$ or may be flanged thereto.

The feed-pipe $i$ enters the drum of the boiler, as shown in the drawings, and is formed into a siphon-bend $i'$, carrying the feed-pipe over the forward end $g$ of the first section A. This inlet-pipe $i$ terminates in the trough somewhat below the level of its entry in the drum B of the boiler. The apparatus is set in the drum B of the boiler so that its upper edge $f$ is not less than two inches above the level of the water circulating in the boiler.

The working of the apparatus depends on the forcing of the feed-water to descend to the bottom of the recessed portions $d$ and to rise from there over the edges of the partitions $e$, and my experiments have demonstrated that the more tortuous the flow of the water is made and the greater the difference produced between the depth of the recesses $d$ and the height of the partitions $e$ the more efficiently the apparatus works. The form of the recesses $d$ is more or less immaterial; but their location, their depth, and capacity for holding up the flow is important for the operation of the device.

The operation of the apparatus is as follows: The water flows from the feed-pipe $i$ into the first compartment, passing underneath the deflecting-plate $d'$, and takes a circuitous route (as shown by the arrows) under the first deflecting-plate $d'$ in the recessed portion of the trough and then again up and over the partition $e$, then down again and under the second deflecting-plate $d'$, and so on until it reaches the last compartment, where it flows over the end of the trough, which is made lower than the sides. This falling and rising of the water as it flows from one side to the other of the deflected plate $d'$ is regularly repeated in its flow through the successive compartments of the trough. This causes a regularly-decreasing and rising of the temperature, due to the difference in temperature of the successive strata in the surrounding water in the boiler-drum, the lowest temperature being at the base of the trough and the highest at the surface when it comes in contact with the steam. This repeated rise and fall in temperature enables the water to deposit a maximum amount of its crust-forming substances, and owing to its circuitous route it gradually deposits what sediment it contains and enters the boiler substantially pure.

I am aware that devices for clarifying the feed-water have been used with partitions similar to those I have employed, but with a trough having a uniformly even bottom. The scale-forming substances and sediment, which it is the object of the clarifying device to retain, are often found in very considerable amounts in some waters. In such a device the bottom of the trough will soon be filled with this sediment to a height sufficient to close the ports in the partitions that are raised from the bottom and render the device inoperative, the water then flowing over the top of the trough. Before these openings are entirely clogged (and, in fact, while any sediment at all is there) the current of water will continually rile it and gradually carry it over to the last compartment, where it will either enter the boiler or if the outlet be provided with a screen it will become stopped up and again render the device inoperative. Attempts have been made to employ a blow-out pipe to remove these incrustations which have settled and formed in the bottom of the trough; but this is not practical, as incrustations adhere strongly to the trough and have to be hammered or scraped off, many of the scales being too large to pass through the openings in a blow-out pipe. Frequent blowing out also causes objectionable interruptions in using the boiler. I have overcome these obstacles by forming the bottom of the trough into recesses and raised portions. The sediment deposited and the incrustations formed in these recesses are undisturbed and the path for the circulation of the feed-water left always freely open, it only being necessary to withdraw the trough from the drum as such times as is convenient and the apparatus thoroughly cleaned and again replaced in the boiler.

I claim as my invention—

1. A device for eliminating scale-producing substances and other impurities from feed-water, the device comprising a trough having its bottom recessed at intervals, partitions set up on the raised portions of the bottom and extending therefrom to a point below the upper edge of the trough; deflecting-plates, set approximately in the center lines of the recessed portions of the trough and having their upper edges flush with the upper edge of the trough; means for feeding the water in one end of the trough and an overflow-outlet on its other end, substantially as herein shown and described.

2. A device for eliminating scale-producing substances and other impurities from feed-water, the device comprising a trough having its bottom recessed at intervals, partitions set up on the raised portions of the bottom and extending therefrom to a point below the upper edge of the trough; deflecting-plates, set approximately in the center lines of the recessed portions of the trough and having their upper edges flush with the upper edge of the trough; a cover upon the trough extending from the end thereof to the first partition, means for feeding the water into the closed portion of the trough, in front of the deflecting-plate, and an overflow-outlet on the other end of the trough, substantially as herein shown and described.

CHARLES TIMMERMAN.

Witnesses:
ALEXANDER URQUHART,
BENJ. G. HUTCHINGS.